Patented July 12, 1938

2,123,482

UNITED STATES PATENT OFFICE 2,123,482

PROCESS OF PREPARING MIXTURES OF RUBBER

Johan Richard de Jong, Amsterdam, Netherlands, assignor to Shell Development Company, San Francisco, Calif., a corporation of Delaware No Drawing. Application September 29, 1937, Serial No. 166,370. In the Netherlands October 6, 1936

2 Claims. (Cl. 106—23)

This invention relates to a process of manufacturing pulverulent mixtures of rubber with fillers by atomization and drying of latex or the like with fillers.

It is already known to dry latex by atomization in a stream of hot air or gas—whereby the latex may also be mixed with fillers, vulcanizing agents or the like—with a view to obtaining a porous spongy mass, which is then compressed under high pressure.

It is also known to collect the atomized and dried latex on a conveyor, the rubber being obtained in a strip as sheet or crepe rubber. It has further been proposed to prepare rubber in small particles, practically consisting of threads, pellets or crumbs, by applying latex in non-coherent drops on a drying surface, for example, a moving endless belt or a drying drum, and scraping off the dried particles.

It has also been proposed to prepare rubber in a pulverulent form by atomizing latex or the like in a hot drying atmosphere and freeing the hot rubber particles thus obtained of the stickiness by cooling. On the other hand, it is known to prepare pulverulent rubber by mixing the latex before atomization with protective colloids, such as dextrine, haemoglobine albumina, contingently while adding substances having a resinifying effect on the colloid employed.

The process according to the invention consists in the latex or other rubber dispersion being atomized as a mist by means of a stream of cold or moderately hot air and this latex mist being dried by a stream of hot air or gas, whilst the carbon black and any other admixtures are blown in the finely divided state into the latex mist.

For the atomization of the latex use may be made of one or more atomizers of known construction, whereby the atomizing air is heated to a maximum temperature of only about 30–50° C., so as to avoid premature coagulation of the latex. After the atomization the latex mist may be immediately contacted with a stream of hot air or gas with a temperature of 120° C. or higher, such with a view to accelerating the drying as much as possible. At the same time the finely divided carbon black is blown into the latex mist, which may be effected by atomization with preferably heated air or some other gas. In order to promote a thorough mixture of the latex particles with the carbon black, the latter may, for instance, be atomized in countercurrent into the latex mist. In some cases the carbon black may also be suspended in the stream of hot air or gas used for drying the latex. The temperatures and quantities of the various streams of air or gas are regulated in such a manner that the temperature of the treated material does not exceed the temperature at which conversion takes place.

The formation of a dry pulverulent product may be promoted by blowing a stream of preferably hot air or gas into the substantially dry mixture of rubber with carbon black before the latter comes into contact with the walls of the apparatus or some other surface, after which the dry product is collected, whilst discharging the stream of air or gas and cooling.

I have further found that a definite minimum quantity of carbon is necessary in order to obtain the desired dry pulverulent noncohesive product. This minimum I have found to be approximately 15% by weight of the final product or 7.5% of the weight of the usual commercial latex. I have further found that where carbon containing very small particles such as those of channel black is used, less carbon is required than when a coarser grained carbon is used so that when a coarser grained carbon is used, it may be necessary to use as much as 30% or more of carbon by weight of the final product in order to obtain a pulverulent noncohesive product.

The pulverulent mixtures of rubber with carbon black produced according to the invention are highly stable. They may be mixed with other substances, such as sulphur or other vulcanizing agents, fillers, fibrous materials, etc., and subsequently pressed into moulds and vulcanized. The powders are also quite suitable for local vulcanization, for instance, in tire repairs, or in road construction as addition to bituminous materials.

The following is an example of operation:

Example

Latex was introduced under pressure into an atomizer and 150 grams were atomized in a heat-insulated drying vessel with 13 cubic meters of air which had been preheated to about 46° C. For drying the latex 12 cubic meters of a secondary stream of air heated to about 214° C. was blown through an annular space provided around the atomizer, in such a manner that the said stream was led into the atomized latex at a sharp angle. At the same time 40 grams carbon black was atomized into the latex mist in countercurrent at about 50 centimeters distance from the latex atomizer, with 2.7 cubic meters of air. Further a quantity of air heated to about 66° C. was blown into the atomized mixture in countercurrent on the opposite side of the drying vessel. Subsequently, the material was passed, together with the air, into a settling space, where the dry rubber-carbon black powder was allowed to settle and cool down, whilst the moist air was drawn off.

It should be understood that while in the above example I have given certain air stream temperatures and velocities, that these temperatures and velocities may be changed within reasonable limits without departing from the invention.

It should be noted that whereas I have described the process as one for mixing carbon black with latex, the process is adaptable for use with fillers, for example, zinc oxide, barium sulfate, calcium carbonate.

I claim as my invention:

1. Process for the manufacture of pulverulent mixtures of rubber with carbon black comprising atomizing latex into a stream of heated air blowing approximately 15% by weight of carbon black into said atomized latex, said weight of carbon black being calculated on the weight of the resulting pulverulent mixture.

2. Process for the manufacture of pulverulent mixtures of rubber with carbon black comprising atomizing latex with a stream of air heated to not over a maximum temperature of 50° C., blowing approximately 15% by weight of carbon black into said atomized latex, said weight of carbon being calculated on the weight of the resulting pulverulent mixture.

JOHAN RICHARD DE JONG.